United States Patent
He et al.

(10) Patent No.: US 10,099,931 B2
(45) Date of Patent: Oct. 16, 2018

(54) ONE-STEP PREPARATION METHOD FOR HOLLOW SHELL TYPE SMALL GRAIN ZSM-5 MOLECULAR SIEVE

(71) Applicants: RESEARCH INSTITUTE OF SHAANXI YANCHANG PETROLEUM (GROUP) CO., LTD., Xi'an, Shaanxi (CN); DALIAN UNIVERSITY OF TECHNOLOGY, Dalian, Liaoning Province (CN)

(72) Inventors: Jiuchang He, Xi'an (CN); Wei Zhang, Xi'an (CN); Xiongfu Zhang, Xi'an (CN); Dapeng Li, Xi'an (CN); Ruimin Gao, Xi'an (CN); Yongbin Lu, Xi'an (CN); Shuqin Zhang, Xi'an (CN); Mingfeng Wang, Xi'an (CN); Pengju Huo, Xi'an (CN); Si Li, Xi'an (CN); Yuan Zhang, Xi'an (CN); Zhiling Liu, Xi'an (CN); Gang Chen, Xi'an (CN); Ting Pei, Xi'an (CN); Hua Zhang, Xi'an (CN)

(73) Assignees: RESEARCH INSTITUTE OF SHAANXI YANCHANG PETROLEUM (GROUP) CO., LTD., Xi'an (CN); DALIAN UNIVERSITY OF TECHNOLOGY, Dalian (CN)

(*) Notice: Subject to any disclaimer, the term of this patent is extended or adjusted under 35 U.S.C. 154(b) by 10 days.

(21) Appl. No.: 15/500,445

(22) PCT Filed: Jul. 14, 2015

(86) PCT No.: PCT/CN2015/083941
§ 371 (c)(1),
(2) Date: Jan. 30, 2017

(87) PCT Pub. No.: WO2016/015557
PCT Pub. Date: Feb. 4, 2016

(65) Prior Publication Data
US 2017/0190589 A1    Jul. 6, 2017

(30) Foreign Application Priority Data
Jul. 28, 2014  (CN) .......................... 2014 1 0361785

(51) Int. Cl.
*C01B 39/40* (2006.01)

(52) U.S. Cl.
CPC .......... *C01B 39/40* (2013.01); *C01P 2004/04* (2013.01); *C01P 2004/34* (2013.01); *C01P 2004/38* (2013.01); *C01P 2004/62* (2013.01)

(58) Field of Classification Search
CPC .. C01B 39/40; C01P 2004/04; C01P 2004/34; C01P 2004/38; C01P 2004/62
See application file for complete search history.

(56) References Cited

U.S. PATENT DOCUMENTS

2017/0190589 A1* 7/2017 He .......................... C01B 39/40

FOREIGN PATENT DOCUMENTS

| CN | 1607176 A | 4/2005 |
|---|---|---|
| CN | 1958453 A | 5/2007 |
| CN | 103771450 A | 5/2014 |

OTHER PUBLICATIONS

Oct. 21, 2015 Search Report issued in International Patent Application No. PCT/CN2015/083941.
Oct. 21, 2015 Written Opinion issued in International Patent Application No. PCT/CN2015/083941.
Dec. 12, 2015 Office Action issued in Chinese Patent Application No. 20141031785.5.
Jinhu et al., "Synthesis of Silicate Hollow Sphere with SiO2 Templates", Shandong Ceramics, vol. 36, No. 3, Jun. 2013.
Wang et al., "Nanoporous zeolite single crystals: ZSM-5 nanoboxes with uniform intracrystalline hollow structures", Microporous and Mesoporous Materials, vol. 113, pp. 286-295, 2008.

* cited by examiner

*Primary Examiner* — David M Brunsman
(74) *Attorney, Agent, or Firm* — Oliff PLC

(57) ABSTRACT

A method for directly preparing an empty shell type small grain ZSM-5 molecular sieve. The method comprises: uniformly mixing and stirring an organic template agent, a silicon source and water; dripping an aqueous solution of an aluminum source into the mixture; preserving room temperature, and continuously stirring for a period of time; and performing hydrothermal crystallization, and washing, drying and roasting the obtained product to obtain the molecular sieve. The molecular sieve has high degree of crystallinity and uniform particle size. Moreover, the method requires short time, simple operation and only one step, no extra surfactant is needed, and secondary acid and alkali treatment is not needed.

6 Claims, 4 Drawing Sheets

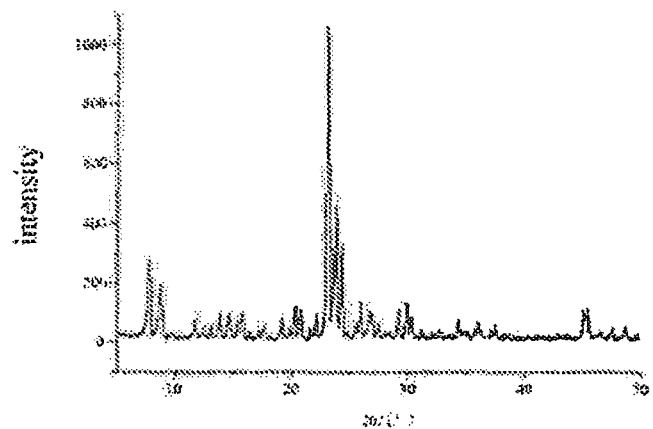
[Figure No.] Fig. 1
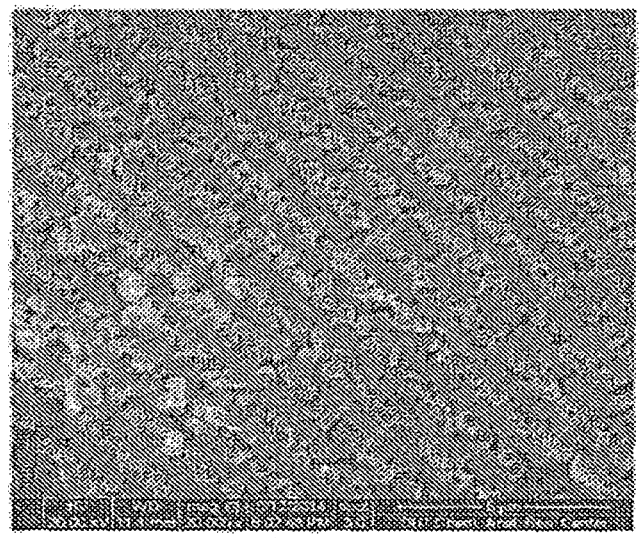
[Figure No.] Fig. 2

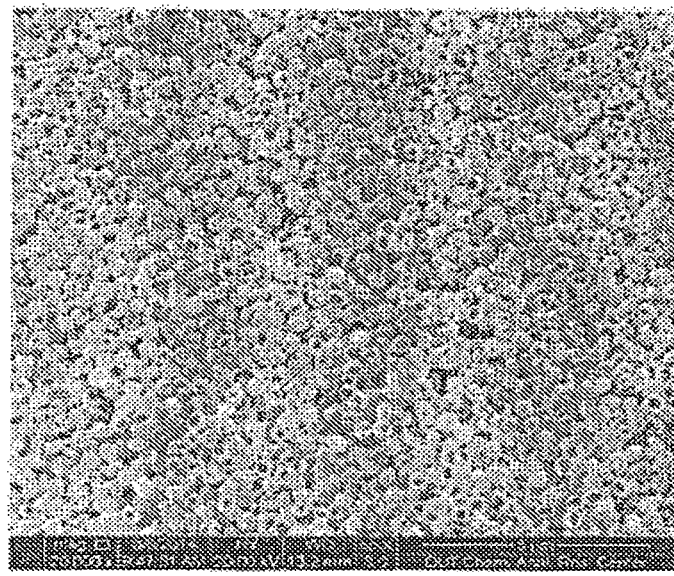
[Figure No.] Fig. 3
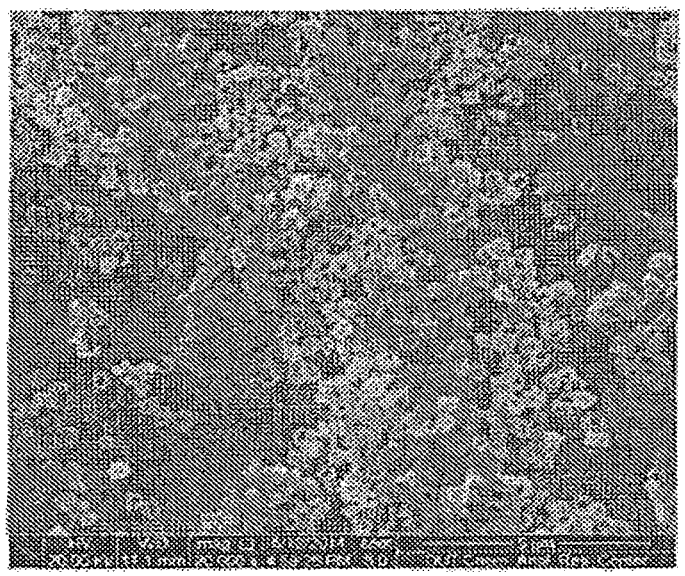
[Figure No.] Fig. 4

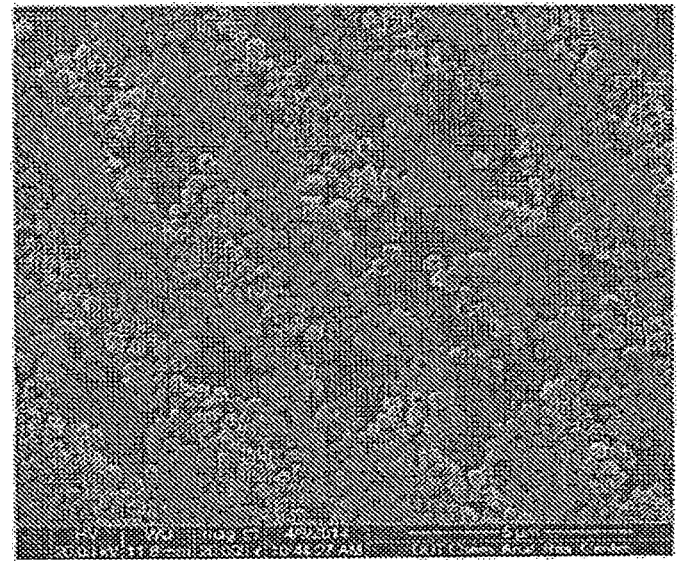
[Figure No.] Fig. 5
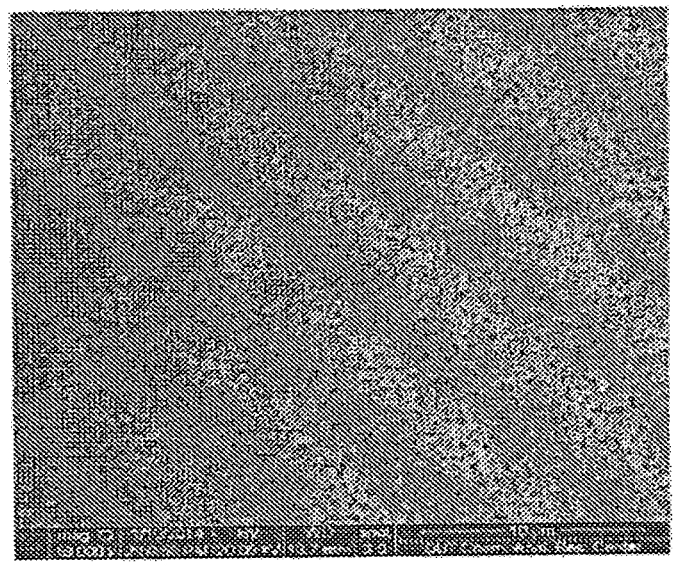
[Figure No.] Fig. 6

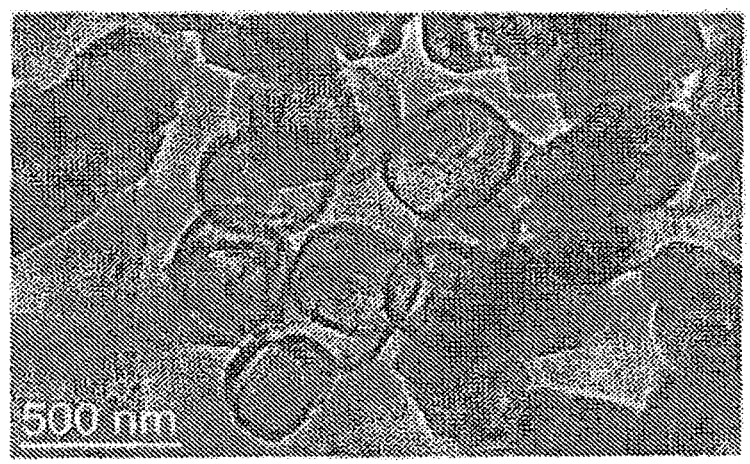
[Figure No.] Fig. 7

ONE-STEP PREPARATION METHOD FOR HOLLOW SHELL TYPE SMALL GRAIN ZSM-5 MOLECULAR SIEVE

TECHNICAL FIELD

The present invention provides a direct preparation method for a ZSM-5 molecular sieve.

BACKGROUND ART

In recent years, materials with a hollow structure attract lots of attention due to their wide application prospects in the areas of catalysis, drug delivery and controlled release, the optical field and electrochemical field. The single crystal zeolite with a hollow structure, as a special material, has gained popularity because of its unique porous structure, relatively large specific surface area and porosity, excellent catalytic activity, stability and shape selectivity. In such a hollow single crystal zeolite, the time an object molecule stays in the microporous passages has been greatly shortened, and accordingly the mass transfer performance is improved. At the same time, when compared with a large grain molecular sieve, the small grain molecular sieve has a greater external surface area, shorter porous passage, rich surface acid sites, as well as greatly improved stability, activity and selectivity of catalyst. Therefore, the small grain molecular sieve exhibits relatively better catalytic properties in most important catalytic reactions.

Until now, only a limited number of single crystal ZSM-5 molecular sieves with hollow structure have been reported. Most of them have been prepared with a two-step synthesis approach, in which the ZSM-5 molecular sieve grain that can meet certain requirements is first prepared through a conventional molecular sieve preparation process, and then the obtained zeolite grain is further treated with a liquid of acid or base to obtain the single crystal zeolite molecular sieve with hollow structure. For examples, Mei et al. treated the synthesized zeolite molecular sieve in a size of about 350 nm with a weak base of 0.6 M $Na_2CO_3$ to obtain hollow small grain ZSM-5 molecular sieve (Mei C, Liu Z, Wen P, et al. Regular HZSM-5 microboxes prepared via a mild alkaline treatment, *Journal of Materials Chemistry*, 2008, 18 (29): 3496-3500); Wang et al. first synthesized the nano-level Silicalite-1 zeolite, and subsequently the nano-level Silicalite-1 zeolite was loaded into a ZSM-5 synthesis solution with tetrapropyl ammonium hydroxide as the templating agent for recrystallization, so as to obtain the ZSM-5 molecular sieve with hollow structure (Yongrui Wang, Alain Tuel, Nanoporous zeolite single crystals: ZSM-5 nanoboxes with uniform intracrystalline hollow structures, *Microporous and Mesoporous Materials*, 2008, 113: 286-295); Song et al. first synthesized the small grain titanium silicalite molecular sieve (TS-1), and used a base of organic quaternary ammonium to treat TS-1, and finally obtained the small grain TS-1 molecular sieve with hollow structure (Song, W., Dai, C., He, Y. , et al. Modification of small-crystal titanium silicalite-1 with organic bases: Recrystallization and catalytic properties in the hydroxylation of phenol. *Applied Catalysis A-General*, 2012, 453: 272-279); Fodor et al. first synthesiied a nano-scale ZSM-5 molecular sieve, which was then etched with a 0.1 M sodium hydroxide solution and then washed with a 0.1 M hydrochloric acid solution to obtain a hollow nanoscale single crystal ZSM-5 zeolite (Fodor D, Pacosova L, Krumeich F, et al. Facile synthesis of nano-sized hollow single crystal zeolites under mild conditions, *Chemical Communications*, 2014, 50 (1): 76-78); the patent CN102491366A reported the synthesized monodisperse ZSM-5 nanoscale zeolites with various ratios of silicon to aluminum and various particle sizes were mixed with the aqueous alkaline solutions with different concentrations, which were then stirred at various temperatures for a certain period of time, so as to form a regular cavity structure, and the cavity size of the zeolite can be altered by way of adjusting the treatment conditions.

In light of the foregoing, it can be seen that although there are certain reports on the zeolite molecular sieves with hollow structure, their synthesis and preparation processes are relatively complex. In addition, it is necessary to add certain solutions of acid or base for treatment in order to obtain the respectively molecular sieves with certain hollow structure. These preparation processes waste energy, consume time and pollute the environment.

TECHNICAL PROBLEM

The present invention intends to address the currently existing issues in the preparation process of hollow molecular sieve, and provides a new one-step preparation method for the hollow shell type small grain ZSM-5 molecular sieve. The foregoing preparation method has the advantages of simple operation, short synthesis cycle and so on. In addition, the synthesis process does not need the addition of any surface active agent and is free of a secondary acidic or basic treatment. In this way, the present invention is able to quickly synthesize, in one step, the monodisperse submicron scale hollow shell type ZSM-5 molecular sieves featuring uniform particle size, no impurity crystal, a homogeneous shell wall and regular structure.

SOLUTION FOR THE TECHNICAL PROBLEM

Technical Solution

The present invention provides a one-step preparation method for the hollow shell type small grain ZSM-5 molecular sieve, which comprises the following specific steps: first mixing an organic templating agent, a silicon source and water and stirring; then adding dropwise an aqueous solution of aluminum source; maintaining the room temperature and stirring for a period of time; next carrying out a hydrothermal crystallization process, and then washing, drying, roasting the obtained product, so as to obtain the hollow shell type small grain ZSM-5 molecular sieve, wherein the ratio of the organic templating agent, the silicon source and the aluminum source is determined according to needs, which does not affect the quality of the finally obtained hollow shell type small grain ZSM-5 molecular sieve.

Preferably, the organic templating agent is tetrapropylammonium hydroxide, the silicon source is ethyl orthosilicate, and the aluminum source is sodium aluminate.

More preferably, a molar ratio of the $SiO_2$ in the silicon source to the $Al_2O_3$ in the aluminum source is from 60 to 100.

Preferably, a time period for the step of stirring at room temperature is from 2 to 24 h.

Preferably, the drying step is carried out at a temperature of 110° C., the roasting step is carried out at a temperature of 550° C., and the roasting step is carried out for 5 h.

Preferably, the hydrothermal crystallization process is carried out at a temperature of 130° C. to 170° C. and for a time period of 6 to 48 h.

Preferably, the obtained hollow shell type small grain ZSM-5 molecular sieve has a particle size of 200 to 800 nm.

ADVANTAGEOUS EFFECTS OF THE PRESENT INVENTION

Advantageous Effects

The present invention has the following advantages:

(1) The synthesized hollow shell type small grain ZSM-5 molecular sieve features uniform particle size, no impurity crystal, a homogeneous shell wall and regular structure. In addition, the preparation method provided in the present invention features a simple operation and short synthesis process. In addition, the synthesis process does not need the addition of any surface active agent and is free of a secondary acidic or basic treatment. In this way, the present invention is able to save time and energy, and the provided method is quick and convenient.

(2) The hollow shell type small grain ZSM-5 molecular sieves with various particle sizes can be obtained by way of adjusting synthesizing conditions.

(3) The hollow degree of the ZSM-5 molecular sieve can be further adjusted by way of altering synthesizing systems or synthesizing conditions.

BRIEF DESCRIPTION OF THE DRAWINGS

Description of Drawings

FIG. 1 is an XRD diagram of the hollow shell type ZSM-5 molecular sieve obtained in the Embodiment 1.

FIG. 2 is an SEM diagram of the hollow shell type ZSM-5 molecular sieve obtained in the Embodiment 1.

FIG. 3 is an SEM diagram of the hollow shell type ZSM-5 molecular sieve obtained in the Embodiment 2.

FIG. 4 is an SEM diagram of the hollow shell type Z.SM-5 molecular sieve obtained in the Embodiment 3.

FIG. 5 is an SEM diagram of the hollow shell type ZSM-5 molecular sieve obtained in the Embodiment 4.

FIG. 6 is an SEM diagram of the hollow shell type ZSM-5 molecular sieve obtained in the Embodiment 5.

FIG. 7 is a TEM diagram of the hollow shell type ZSM-5 molecular sieve obtained in the Embodiment 2.

EXEMPLARY EMBODIMENTS OF THE INVENTION

Embodiments of the Present Invention

Embodiment 1:

Mix 17.6 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.2 g sodium aluminate and 20 g water to the foregoing mixture, stir at room temperature for 2 h, and then load into a stainless synthesis reactor, crystallize at a temperature of 170° C. for 48 h, and then filter and wash the obtained product, then dry at a temperature of 110° C. and roast at a temperature of 550° C. for 5 h. FIG. 1 is an XRD diagram of the small grain sample obtained in this embodiment. It can be seen from the figure that the obtained sample shows the characteristic peaks of a typical MFI type zeolite, and no impurity peak is shown in the figure, which indicates that the sample is a pure ZSM-5 molecular sieve. FIG. 2 is an SEM diagram of the sample obtained in this embodiment. It can be seen from the figure that the obtained hollow shell type ZSM-5 molecular sieve has a particle size of 560 nm, and the particle size thereof is uniform.

Embodiment 2

Mix 17.6 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.2 g sodium aluminate and 20 g water to the foregoing mixture, stir at room temperature for 2 h, and then load into a stainless synthesis reactor, crystallize at a temperature of 130° C. for 48 h, and then filter and wash the obtained product, then dry at a temperature of 110° C. and roast at a temperature of 550° C. for 5 h. FIGS. 3 and 7 show the SEM diagram and TEM diagram of the sample obtained in this embodiment. It can be seen from the figure that the obtained hollow shell type ZSM-5 molecular sieve has a particle size of 390 nm. In addition, the obtained sample has uniform particle size, regular structure and uniform shell wall.

Embodiment 3:

Mix 23.4 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.2 g sodium aluminate and 20 g water to the foregoing mixture, stir at room temperature for 2 h, and then load into a stainless synthesis reactor, crystallize at a temperature of 170° C. for 48 h, and then filter and wash the obtained product, then dry at a temperature of 110° C. and roast at a temperature of 550° C. for 5 h. FIG. 4 shows the SEM diagram of the sample obtained in this embodiment. It can be seen from the figure that the obtained hollow shell type ZSM-5 molecular sieve has a particle size of 430 nm, and the particle size thereof is uniform.

Embodiment 4:

Mix 17.6 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.2 g sodium aluminate and 20 g water to the foregoing mixture, stir at room temperature for 24 h, and then load into a stainless synthesis reactor, crystallize at a temperature of 170° C. for 6 h, and then filter and wash the obtained product, then dry at a temperature of 110° C. and roast at a temperature of 550° C. for 5 h. FIG. 5 shows the SEM diagram of the sample obtained in this embodiment. It can be seen from the figure that the obtained hollow shell type ZSM-5 molecular sieve has a particle size of 380 nm, and the particle size thereof is uniform.

Embodiment 5:

Mix 17.6 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.12 g sodium aluminate and 20 g water to the foregoing mixture, stir at room temperature for 2 h, and then load into a stainless synthesis reactor, crystallize at a temperature of 170° C. for 48 h, and then filter and wash the obtained product, then dry at a temperature of 110° C. and roast at a temperature of 550° C. for 5 h. FIG. 6 shows the SEM diagram of the sample obtained in this embodiment. It can be seen from the figure that the obtained hollow shell type ZSM-5 molecular sieve has a particle size of 450 nm, and the particle size thereof is uniform.

Embodiment 6:

Mix 17.6 g of the templating agent tetrapropylammonium hydroxide, 16.0 mg of ethyl orthosilicate and 10 g water and stir, so as to obtain a gel-like substance with certain microcapsule micellar structure, next slowly add dropwise a mixed solution of 0.2 g sodium aluminate and 20 g water to the foregoing mixture, stir at room temperature for 12 h, and then load into a stainless synthesis reactor, crystallize at a temperature of 150° C. for 24 h, and then. filter and wash the obtained product, then dry at a temperature of 110° C. and roast at a temperature of 550° C. for 5 h. FIG. 7 shows the SEM diagram of the sample obtained in this embodiment. It can be seen from the figure that the obtained hollow shell type ZSM-5 molecular sieve has a particle size of 750 nm, and the particle size thereof is uniform.

The invention claimed is:

1. A preparation method for a hollow shell type small grain ZSM-5 molecular sieve, comprising:
    first mixing an organic templating agent, a silicon source and water and stirring;
    then adding dropwise an aqueous solution of aluminum source;
    maintaining the room temperature and stirring for a period of time;
    next carrying out a hydrothermal crystallization process; and then
    washing, drying, and roasting the obtained product, so as to obtain the hollow shell type small grain ZSM-5 molecular sieve, wherein
        the organic templating agent is tetrapropylammonium hydroxide,
        the silicon source is ethyl orthosilicate, and
        the aluminum source is sodium aluminate.

2. The preparation method for the hollow shell type small grain ZSM-5 molecular sieve according to claim 1, wherein a molar ratio of the $SiO_2$ in the silicon source to the $Al_2O_3$ in the aluminum source is from 60 to 100.

3. The preparation method for the hollow shell type small grain ZSM-5 molecular sieve according to claim 1, wherein a time period for the step of stirring at room temperature is from 2 to 24 h.

4. The preparation method for the hollow shell type small grain ZSM-5 molecular sieve according to claim 1, wherein
    the drying step is carried out at a temperature of 110° C.,
    the roasting step is carried out at a temperature of 550° C., and
    the roasting step is carried out for 5 h.

5. The preparation method for the hollow shell type small grain ZSM-5 molecular sieve according to claim 1, wherein the hydrothermal crystallization process is carried out at a temperature of 130° C. to 170° C and for a time period of 6 to 48 h.

6. The preparation method for the hollow shell type small grain ZSM-5 molecular sieve according to claim 1, wherein the obtained hollow shell type small grain ZSM-5 molecular sieve has a particle size of 200 to 800 nm.

* * * * *